United States Patent [19]
Brown

[11] Patent Number: 5,506,274
[45] Date of Patent: Apr. 9, 1996

[54] PROCESS FOR MAKING RUBBERIZED CARBON BLACK FROM WASTE RUBBER AND MATERIALS MADE THEREFROM

[75] Inventor: William F. Brown, Bartholomew County, Ind.

[73] Assignee: Wolf Industries, Inc., Indianapolis, Ind.

[21] Appl. No.: 216,625

[22] Filed: Mar. 23, 1994

[51] Int. Cl.$^6$ .............. C08J 11/04; C07C 4/08; C09C 1/56; C23C 16/00
[52] U.S. Cl. .......... 521/41; 423/449.6; 423/449.7; 423/460; 428/403; 427/249
[58] Field of Search .......... 521/41; 423/449.6, 423/449.7, 460; 428/403; 427/249

[56] References Cited

U.S. PATENT DOCUMENTS

| | | | |
|---|---|---|---|
| 2,457,962 | 11/1949 | Whaley | 260/766 |
| 2,457,963 | 7/1949 | Thodos | 18/1 |
| 2,511,901 | 3/1950 | Bunn | 18/48 |
| 2,526,120 | 4/1950 | Crouch | 260/41.5 |
| 2,684,290 | 9/1954 | Alexander et al. | 23/314 |
| 2,758,039 | 2/1956 | Barbour | 117/100 |
| 2,900,737 | 11/1959 | Heller | 34/12 |
| 2,908,586 | 6/1959 | Braendle | 106/307 |
| 3,644,131 | 2/1972 | Gotschall | 106/307 |
| 3,822,218 | 2/1974 | Whittaker | 252/421 |
| 3,823,221 | 10/1974 | Wakefield et al. | 423/449 |
| 3,823,223 | 7/1974 | Liska et al. | 423/449.6 |
| 3,966,487 | 6/1976 | Crane et al. | 423/449.7 |
| 3,978,199 | 8/1976 | Maruhnic et al. | 423/449.7 |
| 4,235,676 | 9/1980 | Chambers | 202/118 |
| 4,337,294 | 3/1982 | Gunnell | 428/407 |
| 4,440,807 | 1/1984 | Gunnell | 427/221 |
| 4,530,305 | 2/1985 | Gunnell | 118/418 |
| 5,037,628 | 8/1991 | Fader | 423/449.7 |
| 5,085,738 | 2/1992 | Harris et al. | 423/449.7 |
| 5,168,012 | 4/1992 | Watson et al. | 428/408 |
| 5,224,432 | 7/1993 | Milsap, III | 110/341 |
| 5,389,691 | 2/1995 | Cha et al. | 521/41 |

FOREIGN PATENT DOCUMENTS

| | | | |
|---|---|---|---|
| 0303447 | 2/1989 | European Pat. Off. | 423/449.7 |
| 51-52392 | 2/1976 | Japan . | |
| 664350 | 6/1950 | United Kingdom . | |
| 000625 | 9/1979 | WIPO | 423/449.7 |

*Primary Examiner*—Paul R. Michl
*Assistant Examiner*—Olga Asinevskg
*Attorney, Agent, or Firm*—Jack Schuman

[57] ABSTRACT

Waste rubber containing carbon black is broken down in size into small pieces, purged of air and then fed into a retort, likewise purged of air and continuously rotated or oscillated about its longitudinal axis. The retort is maintained at a temperature ranging between 275° F. and 1000° F., and preferably ranging between 500° F. and 850° F., to produce rubberized carbon black consisting of particles of carbon, each particle encapsulated in a sphere of rubber of 1–60 microns in diameter.

Rubberized carbon black can be compounded with virgin rubber or polymer such as scrap high density polyethylene or both virgin rubber and polymer, and can then be formed into various shapes having useful and valuable physical, mechanical and thermal properties.

9 Claims, 1 Drawing Sheet

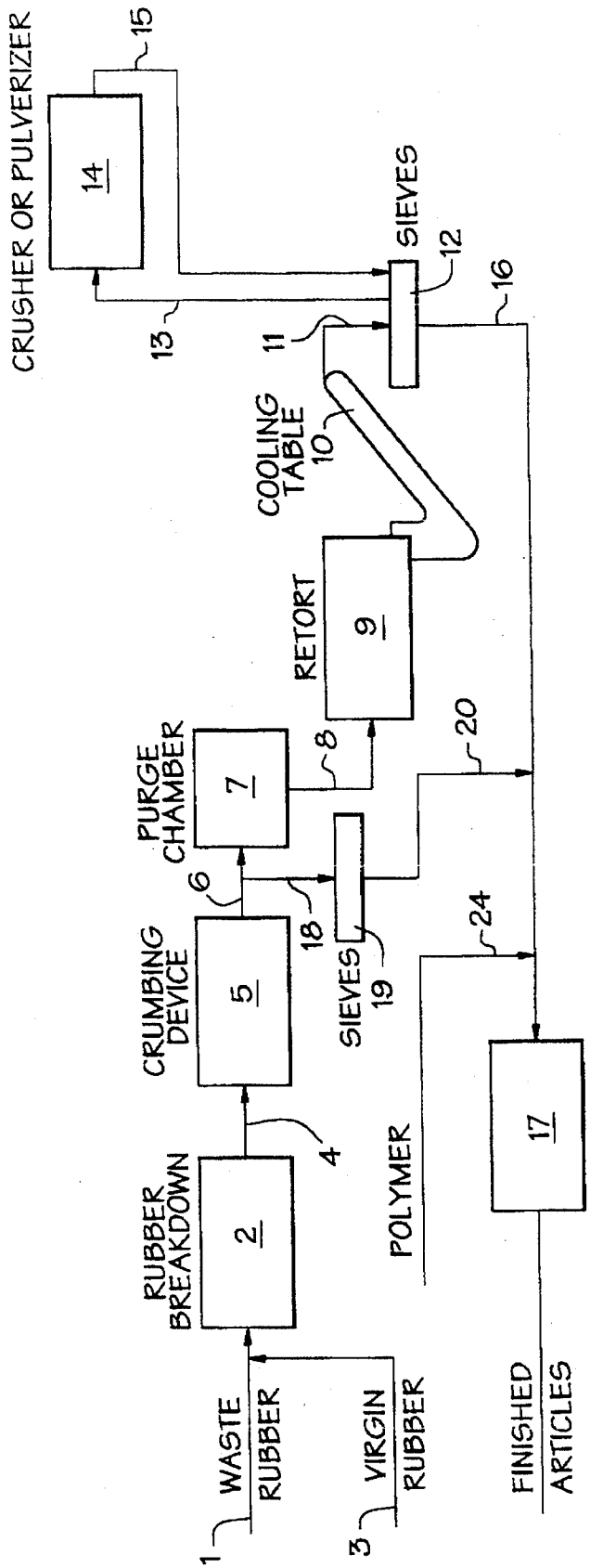
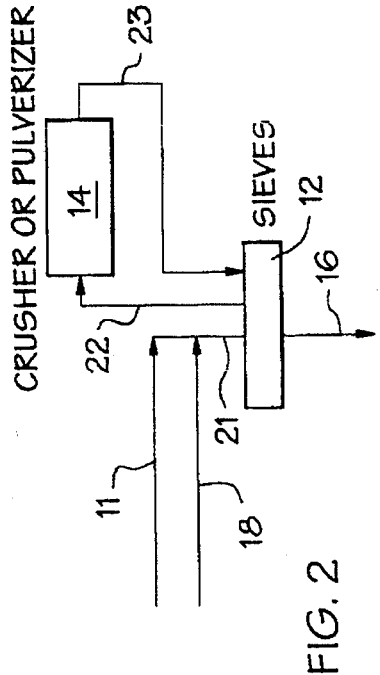
FIG. 1
FIG. 2

PROCESS FOR MAKING RUBBERIZED CARBON BLACK FROM WASTE RUBBER AND MATERIALS MADE THEREFROM

BACKGROUND OF THE INVENTION

1. Field of the Invention

This invention relates, broadly speaking, to a method of making useful materials from waste rubber and to useful articles having unusual and valuable physical, mechanical and thermal properties made therefrom.

More particularly, this invention relates to a method of making rubberized carbon black from waste rubber such as automobile tires, which waste rubber was originally compounded with carbon black, and to useful articles incorporating said rubberized carbon black.

2. Description of the Prior Art

Many processes are known for recovering the hydrocarbon content (e.g. rubber) and the carbon black content of worn automobile tires for reuse, in one form or another.

Some typical patents disclosing such processes are:

U.S. Pat. No. 4,025,990 (1977) to Lovette discloses a cryogenic process for recovering rubber in the form of crumb rubber, fabric and metal components from scrapped automobile tires.

U.S. Pat. No. 3,997,407 (1976) to Fuji et al. discloses dry distillation of scrap tires in a vertical dry distillation retort to recover carbon black and oil.

U.S. Pat. No. 4,250,158 (1981) to Solbakken et al. discloses pyrolizing used tires in an oxygen-limited hydrocarbon vapor at subatmospheric pressure to eventually recover carbon black, tar, oil and fuel gas.

None of these processes discloses the production of rubberized carbon black from worn automobile tires, nor is there disclosed novel compositions comprising rubberized carbon black and crumb rubber or polymeric materials or both crumb rubber and polymeric materials for the fabrication of useful articles, particularly those of unusual and valuable physical, mechanical and thermal properties.

SUMMARY OF THE INVENTION

One of the objects of this invention is to provide a novel process for making useful materials from waste rubber.

Another of the objects of this invention is to make rubberized carbon black from waste rubber which originally was compounded with carbon black.

A further object of this invention is to make useful articles incorporating rubberized carbon black and having unusual and valuable physical, mechanical and thermal properties.

Yet another object of this invention is to reduce pollution caused by the conventional practice of burning used automobile tires and also to reduce the strain on the capacities of waste disposal sites by making useful materials and articles from scrap material such as used automobile tires which otherwise would be discarded in landfills.

Still other and further objects of this invention will become apparent by reference to the accompanying specification and drawing, and to the appended claims.

Briefly, I have discovered that, by passing a stream of small particles of waste rubber containing carbon black, augmented if desired by a stream of small particles of virgin rubber which may or may not contain carbon black, through a retort operating in a particular temperature range and rotating or oscillating at a particular rate about its longitudinal axis, spherical rubberized particles (particles of carbon black encapsulated in spheres of rubber) in a useful range of 1–60 microns in diameter are obtained. I have also discovered that these rubberized carbon black particles may be compounded with crumb rubber or virgin or scrap thermoplastic or thermosetting polymeric materials or both crumb rubber and polymeric materials and molded to form useful articles having unusual and valuable physical, mechanical and thermal properties.

DESCRIPTION OF THE DRAWINGS

FIG. 1 is a flow diagram of the process herein described.

FIG. 2 is a partial flow diagram showing an alternate arrangement of sieving as herein described.

DESCRIPTION OF THE PREFERRED EMBODIMENT

A stream 1 of scrap rubber, which originally was compounded with carbon black typically as a reinforcing agent, derived as waste from used automobile tires, wire strippings, belts, hoses, gaskets and the like, is fed into breakdown apparatus 2 which may, for example, be a splitter, slicer, tearer or the like. A stream 3 of virgin rubber, which may or may not have been originally compounded with carbon black, may also be introduced into breakdown apparatus 2 to supplement scrap rubber stream 1. Breakdown apparatus 2 reduces scrap rubber stream 1 and virgin rubber stream 3 into small pieces, such as strips or chunks, which may range in size between 1–3 inches.

A stream 4 of small pieces of rubber exiting breakdown apparatus 2 is then conveyed into crumbing device 5 wherein, by means of rollers, cracker mills or conventional mills, the pieces are further reduced into particles ranging in size from 1 micron to ½ inch.

A stream 6 of particles of rubber exiting crumbing device 5 is then conveyed into purge chamber 7, which has been evacuated to a pressure of ½–2 inches of water, as measured by a water column. This is equivalent to a pressure of approximately 0.02–0.07 psig. Virtually all air is removed from the purge chamber 7 and from the mass of particles of rubber fed thereto in this stage of the process.

The stream 8 of air-purged particles of rubber from purge chamber 7 is then introduced into the entrance end of retort 9 which is adjacent the said purge chamber 7.

Retort 9 is of tubular construction, having a preferred inner diameter of approximately 30 inches and a preferred length of approximately 60 feet. Retort 9 is purged of air, preferably by means of a non-oxygen containing gas such as nitrogen or natural gas.

Retort 9 is continuously rotated about its longitudinal axis, preferably at approximately 2 revolutions per minute (2 rpm).

Alternatively, retort 9 may be continuously oscillated about its longitudinal axis, preferably at 4 times per minute, each time making a ¾ revolution.

Retort 9 is operated at an elevated temperature, which may range between 275° F.–1000° F., although the preferred range of operation is 500° F.–850° F.

Retort 9 is operated preferably in a horizontal position, although it can be inclined to the horizontal with the exit end lower than the entrance end.

Conventional means, such as a metal pusher, are provided in retort 9 to continuously move the particles of material fed therein from the entrance end toward the exit end thereof.

As the particles of carbon black-containing rubber progress along the length of rotating or oscillating retort 9, from the entrance end to the exit end thereof, small particles of spherical rubberized carbon black ranging in size between 1–60 microns in diameter, as generally measured, are obtained. The dwell time of the carbon black-containing rubber in passing from the entrance end to the exit end of rotating or oscillating retort 9, is critical to the proper formation of spherical rubberized carbon black in the 1–60 microns size. Such dwell time should be approximately 35–40 seconds.

Hot spherical rubberized carbon black exiting retort 9 is then moved on to a cooling table 10, which, in the preferred embodiment, is an upwardly inclined conveyor in a closed system which has been purged of air in the same manner as retort 9, and which may be cooled by ambient air or by a stream of cooling water, so as to reduce the temperature of the rubberized carbon black to below the ignition point of such rubberized carbon black, and preferably to ambient or near ambient temperature.

Stream 11 of cooled rubberized carbon black is then passed through a series of sieves 12 to be sized as required for the subsequent forming operation. A preferred size range is 3–15 microns screen fineness. Oversize rubberized carbon black from sieves 12 is recycled through line 13 to pulverizer or crumber 14 and then back through line 15 to sieves 12.

The sieved rubberized carbon black 16 is then introduced into forming apparatus 17 which may, for example, be a conventional extruder.

Crumb rubber from crumbing device 5 may be added to sieved rubberized carbon black 16 upstream of the entrance to forming apparatus 17. Thus, a stream 18 of crumb rubber from crumbing device 5, branching off from stream 6, is passed through a series of sieves 19 to be sized as required for the subsequent forming operation, and preferably sized between 80–40 screen fineness. The sieved stream 20 of crumb rubber may then be mixed with the stream 16 of rubberized carbon black upstream of forming apparatus 17.

Alternatively, stream 11 of cooled rubberized carbon black and stream 18 of crumb rubber may be merged into one stream 21 and sized through a single series of sieves 12 as shown in FIG. 2, to a preferred size range of 3–15 microns. Oversized particles from sieves 12 are recycled through line 22 to pulverizer or crusher 14 and then back to sieves 12 through line 23.

Combined streams 16 and 20 may be extruded, rolocast, thermoformed, vacuum formed, or subjected to other forming processes in forming apparatus 17 to produce a variety of useful articles such as pipe, sheet, roofing and other building materials, builder's hardware, sound attenuators, car bumpers and so forth. Conventional blowing agents such as carbon dioxide and nitrogen-releasing compounds can be introduced into forming apparatus 17 during the processing of streams 16 and 20 to produce high strength, light weight articles useful, for example, in airplanes.

Particular physical properties of material produced by the process herein described will depend upon the relative proportions of rubberized carbon black and crumb rubber and, as later described, in the proportion of polymers, in the material.

A broad range of compositions comprising rubberized carbon black and crumb rubber, suitable for making articles having unusual and valuable physical, mechanical and thermal properties is:

Rubberized carbon black 0.5%–99% by weight

Balance essentially crumb rubber.

A preferred range of compositions comprising rubberized carbon black and crumb rubber, suitable for making articles having unusual or valuable physical, mechanical and thermal properties is:

Rubberized carbon black 0.5%–28% by weight

Balance essentially crumb rubber.

Articles formed from materials within the broad range of compositions hereinbefore disclosed have superior resistance to ultraviolet radiation (up to 50 years) and to weathering, and are water resistant.

The physical, mechanical and thermal properties, such as, but not limited to, elasticity, tensile strength, melt flow temperature, density, permeability and impact strength, of the materials hereinabove disclosed can be modified by incorporating in mixtures of rubberized carbon black and crumb rubber any one or more of a number of polymeric materials, which may be thermoplastic or thermosetting. A stream 24 of such polymeric materials, after being broken down and sieved (not shown on flow diagram) to the desired screen fineness, preferably 80–40 screen fineness, can be introduced into stream 16 upstream of the entrance to forming apparatus 17.

These polymeric materials may, for example, include acrylamides, amides, polycarbonates, polyethylene, polypropylene, styrene, butadiene, acrylonitrile-butadiene-styrene (ABS), polyethers, neoprenes, nitriles and mixtures thereof, both scrap and virgin and mixtures thereof.

A broad range of compositions comprising rubberized carbon black, crumb rubber and polymeric material, suitable for making articles having unusual and valuable physical, mechanical and thermal properties is:

| Rubberized carbon black | 0.5–90% by weight |
|---|---|
| Crumb rubber | at least 1.5% by weight |
| Polymer | at least 1.0% by weight |

Material having the following composition:

Rubberized carbon black approximately 52% by weight

Crumb rubber approximately 28% by weight

Balance essentially high density scrap polyethylene was tested according to various ASTM methods and exhibited the properties listed below:

| | Value | ASTM Test | Notes |
|---|---|---|---|
| Physical Properties | | | |
| Melt flow | 1.1 g/10 minutes | D1238 | |
| Density | 42.6 lb/ft.$^3$ | D792 | |
| Moisture content | 0.18% | | |
| Water Absorption | 0% | | |
| Mechanical Properties | | | |
| Tensile strength at break | 8061 psi | D638 | Rate = 20 inch/min |
| Izod impact | | D256 | Room temperature (specimens cooled in ASTM atmospheric testing conditions for |

-continued

| | Value | ASTM Test | Notes |
|---|---|---|---|
| | | | two hours before test) |
| Thermal Properties | | | |
| Brittle temperature | −92° F. | D746 | |
| Deflection temperature | 297° F. | D648 | |
| Temperature range | −60° F. to 340° F. | | |
| Weather Testing | | | |

Samples were placed in a Q-panel accelerated weathering tester for 1092 hours.

A composition particularly useful in making industrial pipe or any other articles requiring superior cold temperature resistance, high impact strength, high tensile and compressive strengths and ultraviolet resistance is:

Rubberized carbon black, approximately 52% by weight
Crumb rubber, approximately 11–14% by weight
Balance high density scrap polyethylene Alternatively, only rubberized carbon black and polymeric material, without crumb rubber, may be used to produce a product with unusual and valuable physical, mechanical and thermal properties.

A broad range of compositions comprising rubberized carbon black and polymeric material, without crumb rubber, suitable for making articles having unusual and valuable physical, mechanical and thermal properties is:

Rubberized carbon black 0.5–90% by weight
Balance essentially polymer

The materials herein disclosed can be made fire resistant by incorporating therein a suitable quantity of a fire retardant such as hydrated borax, inorganic salts and the like. Materials herein disclosed and made fire retardant can be extremely useful in the production of roofing materials because of the no-flow characteristics of such materials.

Materials disclosed herein as comprising rubberized carbon black, crumb rubber, polymers and a fire retardant are particularly useful as paint additives, in furniture production, in carpet manufacturing, electrical wire coverings, and other applications in which no flow, low smoke, zero flame and lack of toxic products are desired characteristics.

Since modifications and changes which do not depart from the spirit of the invention as disclosed herein may readily occur to those skilled in the art to which this invention pertains, the appended claims should be construed as covering suitable modifications and equivalents.

I claim:

1. Method of making rubberized carbon black from waste rubber containing carbon black, said method comprising:
    (a) reducing said waste rubber into small size particles;
    (b) purging air from said particles of waste rubber,
    (c) providing a tubular retort purged of air and having an entrance end and an exit end,
    (d) continuously moving said retort about its longitudinal axis,
    (e) maintaining said continuously moving retort at a temperature ranging between 500° F. and 85° F.,
    (f) introducing said particles of waste rubber into the entrance end of said continuously moving retort,
    (g) advancing said particles of waste rubber toward the exit end of said retort while maintaining said particles of waste rubber within said retort for a time sufficient to convert said particles of waste rubber into spherical rubberized carbon black consisting of particles of carbon black each encapsulated in a sphere of rubber,
    (h) discharging said rubberized carbon black from the exit end of said retort, and
    (i) cooling said rubberized carbon black to a temperature below its ignition point.

2. Method of making rubberized carbon black from waste rubber containing carbon black, said method comprising:
    (a) reducing said waste rubber into small size particles,
    (b) purging air from said particles of waste rubber,
    (c) providing a tubular retort purged of air and having an entrance end and an exit end,
    (d) continuously rotating said tubular retort about its longitudinal axis,
    (e) maintaining said continuously rotating retort at a temperature ranging between 275° F. and 1000° F.,
    (f) introducing said particles of waste rubber into the entrance end of said continuous rotating retort,
    (g) advancing said particles of waste rubber toward the exit end of said retort while maintaining said particles of waste rubber within said retort for a period of time sufficient to convert said particles of waste rubber into spherical rubberized carbon black consisting of particles of carbon black each encapsulated in a sphere of rubber,
    (h) discharging said rubberized carbon black from the exit end of said retort, and
    (i) cooling said rubberized carbon black to a temperature below its ignition point.

3. Method of making rubberized carbon black from waste rubber containing carbon black, said method comprising:
    (a) reducing said waste rubber into small size particles,
    (b) purging air from said particles of waste rubber,
    (c) providing a tubular retort purged of air and having an entrance end and an exit end,
    (d) continuously oscillating said tubular retort about its longitudinal axis,
    (e) maintaining said continuously rotating retort at a temperature ranging between 275° F. and 1000° F.,
    (f) introducing said particles of waste rubber into the entrance end of said continuously oscillating retort,
    (g) advancing said particles of waste rubber toward the exit end of said retort while maintaining said particles of waste rubber within said retort for a period of time sufficient to convert said particles of waste rubber into spherical rubberized carbon black consisting of particles of carbon black each encapsulated in a sphere of rubber,
    (h) discharging said rubberized carbon black from the exit end of said retort, and
    (i) cooling said rubberized carbon black to a temperature below its ignition point.

4. Method of making rubberized carbon black from waste rubber containing carbon black, said method comprising:
    (a) reducing said waste rubber into small size particles,
    (b) purging air from said particles of waste rubber,
    (c) providing a tubular retort purged of air and having an entrance end and an exit end,
    (d) continuously moving said retort about its longitudinal axis,
    (e) maintaining said continuously moving retort at a temperature ranging between 275° F. and 1000° F., (f) introducing said particles of waste rubber into the entrance end of said continuously moving retort, (g) reducing virgin rubber into small size particles, (h) purging air from said particles of virgin rubber, (i) introducing said particles of virgin rubber into the entrance end of said retort to supplement the particles of waste rubber entering the entrance end of said retort, (j) advancing said particles of waste rubber and said particles of virgin rubber toward the exit end of said retort while maintaining said particles of waste rubber and said particles of virgin rubber within said retort for a time sufficient to convert said particles of waste rubber and said particles of virgin rubber into spherical rubberized carbon black consisting of particles of carbon black each encapsulated in a sphere of rubber, (k) discharging said rubberized carbon black from the exit end of said retort, and (l) cooling said rubberized carbon black to a temperature below its ignition point.

5. Method as in claim 1, wherein:

(j) said retort has an inside diameter approximately of 30 inches and a length of approximately 60 feet.

6. Method as in claim 5, wherein:

(k) said retort is rotated about its longitudinal axis at approximately 2 rpm.

7. Method as in claim 5, wherein:

(k) said retort is oscillated about its longitudinal axis approximately three quarters of a revolution at approximately four times per minute.

8. Method as in claim 1, wherein spherical particles of rubberized carbon black in the range of approximately 1–60 microns in diameter are discharged from the exit end of said retort.

9. Method as in claim 1, wherein the dwell time of said particles of waste rubber within said retort is approximately 35–40 seconds.

* * * * *

UNITED STATES PATENT AND TRADEMARK OFFICE
CERTIFICATE OF CORRECTION

PATENT NO. : 5,506,274
DATED : April 9, 1996
INVENTOR(S) : William F. Brown

It is certified that error appears in the above-identified patent and that said Letters Patent is hereby corrected as shown below:

Column 5, claim 1, line 61, after "500°F. and" delete "85°F." and substitute therefor --850°F.--.

Signed and Sealed this

Thirteenth Day of August, 1996

Attest:

BRUCE LEHMAN

*Attesting Officer*     *Commissioner of Patents and Trademarks*